United States Patent
Biehr et al.

(10) Patent No.: US 8,542,800 B2
(45) Date of Patent: Sep. 24, 2013

(54) ASYNCHRONOUS MOTOR WITH FEATURES CREATING MAGNETIC FIELD DISTURBANCE

(75) Inventors: Eric Bruce Biehr, Milwaukee, WI (US); Ian Strider Hunt, Hubertus, WI (US); Ryan James Lemminger, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 301 days.

(21) Appl. No.: 12/888,634

(22) Filed: Sep. 23, 2010

(65) Prior Publication Data

US 2012/0076277 A1  Mar. 29, 2012

(51) Int. Cl.
*H01J 35/10* (2006.01)
*H02P 23/00* (2006.01)

(52) U.S. Cl.
USPC ............ 378/131; 378/125; 318/798; 318/799

(58) Field of Classification Search
USPC ................. 310/166; 318/490, 727, 798, 799; 378/125, 131
See application file for complete search history.

(56) References Cited

U.S. PATENT DOCUMENTS

| | | | |
|---|---|---|---|
| 4,890,058 A | 12/1989 | Trenkler et al. | |
| 5,049,815 A * | 9/1991 | Kliman | 324/545 |
| 5,519,337 A * | 5/1996 | Casada | 324/765.01 |
| 5,565,752 A | 10/1996 | Jansen et al. | |
| 5,739,698 A * | 4/1998 | Bowers et al. | 324/765.01 |
| 5,828,210 A * | 10/1998 | Kliman et al. | 324/173 |
| 5,869,915 A | 2/1999 | Blake | |
| 5,883,487 A * | 3/1999 | Rosenzweig et al. | 318/781 |
| 6,350,109 B1 * | 2/2002 | Brunet et al. | 417/365 |
| 6,449,567 B1 * | 9/2002 | Desai et al. | 702/58 |
| 6,570,960 B1 * | 5/2003 | Kuzniar et al. | 378/125 |
| 6,708,134 B2 * | 3/2004 | McGaughey et al. | 702/145 |
| 7,308,322 B1 * | 12/2007 | Discenzo et al. | 700/28 |
| 7,343,002 B1 * | 3/2008 | Lee et al. | 378/132 |
| 7,911,170 B2 * | 3/2011 | Hauttmann et al. | 318/490 |
| 2009/0140681 A1 | 6/2009 | Hauttmann et al. | |

OTHER PUBLICATIONS

Razik, "On the Monitoring of the Defects of Squirrel Cage Induction Motors," 2003 IEEE Bologna Power Tech Conference, Jun. 23-26, Bologna, Italy, pp. 1-6.
Zhou, "Incipient Bearing Fault Detection for Electric Machines Using Stator Current Noise Cancellation," Dissertation, Georgia Institute of Technology, Dec. 2007, pp. 1-184.

* cited by examiner

*Primary Examiner* — Allen C. Ho
(74) *Attorney, Agent, or Firm* — Ziolkowski Patent Solutions Group, SC

(57) ABSTRACT

A component for introducing disturbances into the magnetic field of an asynchronous motor by altering a reluctance of the motor is disclosed. An asynchronous motor is provided that includes a stator having a plurality of windings that is configured to generate a rotating magnetic field when a current is provided to the plurality of windings. The asynchronous motor also includes a rotor positioned within the stator configured to rotate relative thereto responsive to the rotating magnetic field and a component separate from the stator and the rotor that is positioned within the rotating magnetic field, with the component being configured to alter a magnetic reluctance of the rotor so as create a disturbance in the rotating magnetic field.

18 Claims, 7 Drawing Sheets

ASYNCHRONOUS MOTOR WITH FEATURES CREATING MAGNETIC FIELD DISTURBANCE

BACKGROUND OF THE INVENTION

Embodiments of the invention relate generally to electric motors and, more particularly, to an asynchronous motor including a component for introducing disturbances into the magnetic field of the motor by altering a reluctance of the motor.

The usage of electrical machines in various industries has continued to become more prevalent in numerous industrial, commercial, and transportation industries over time. Due to the prevalence of these motors in industry, it is paramount that the electric motors be operated reliably and efficiently. Motor design parameters and performance parameters are often required by motor management systems to optimize the control and operations of electric motors. Similarly, motor status monitoring enables the electric motors to operate reliably. Many motor status monitoring techniques also look for certain motor design parameters and performance parameters.

One such motor performance parameter that is helpful in optimizing the control and operations of electric motors is rotor or motor speed. However, a typical induction motor design does not have the ability to measure rotor speed without some form of physical detection sensor. In many applications, sensor location, alignment, size, and environmental conditions make the sensor option extremely difficult to integrate into the design while still maintaining a high level of reliability and robustness.

For example, in an x-ray tube environment, implementation of a physical detection sensor is very challenging because of the increased air gap between the sensor (which would be operating in dielectric oil) and the target material (in vacuum). Additionally, positioning of the x-ray tube casing, which is typically formed of a non-ferrous material such as stainless steel, in the air gap between the stator and the rotor attenuates the magnetic field more than air or vacuum. Also, the sensor target material temperature gradient is critical if the target is a permanent magnet (e.g., magnets formed of Samarium Cobalt, for example, are only rated to 350° C. max). Finally, the size restriction of the sensor itself is a challenge, as it is situated between an x-ray tube's casing and insert housing.

While some systems and techniques for sensorless measurement of rotor speed have been provided in the past, such techniques are typically limited in their implementation. For example, a rotor may be designed to be asymmetrical or have saliencies therein that result in a change in impedance as seen at the stator windings, thereby providing for estimation of the rotor speed based on motor current spectrum analysis based on this change in impedance. However, such signals have a poor signal-to-noise ratio (SNR), which limits the ability to effectively measure such signals. Furthermore, as set forth above, the generation of such signals relies on defects designed into the motor, which is highly undesirable with respect to motor performance (e.g., efficiency, torque capability, etc.).

It would therefore be desirable to design an asynchronous motor that provides for detection of rotor speed that is not dependent on measurements acquired via a physical detection sensor, so as to enable the improved motor management and motor status monitoring of asynchronous motors. It would further be desirable for such an asynchronous motor to provide signals having a high SNR and for such signals to be generated without varying an impedance of the motor via the introduction of defects thereto.

BRIEF DESCRIPTION OF THE INVENTION

The invention provides embodiments of an asynchronous motor that includes a component for introducing disturbances into the magnetic field of the motor by altering a reluctance of the motor. The component is a separate component from the stator and the rotor and is positioned within the rotating magnetic field generated by the stator.

In accordance with one aspect of the invention, an asynchronous motor includes a stator having a plurality of windings that is configured to generate a rotating magnetic field when a current is provided to the plurality of windings. The asynchronous motor also includes a rotor positioned within the stator configured to rotate relative thereto responsive to the rotating magnetic field and a component separate from the stator and the rotor that is positioned within the rotating magnetic field, with the component being configured to alter a magnetic reluctance of the rotor so as create a disturbance in the rotating magnetic field.

In accordance with another aspect of the invention, an asynchronous motor including a stator having a plurality of windings and being configured to generate a rotating magnetic field when a current is provided to the plurality of windings. The asynchronous motor also includes a rotor positioned within the stator having a rotor core and a plurality of rotor bar conductors, with the rotor configured to rotate relative to the stator responsive to the rotating magnetic field. The asynchronous motor further includes a component positioned adjacent to the rotor and configured to alter a reluctance of the asynchronous motor so as to generate a disturbance in the rotating magnetic field, with the disturbance in the rotating magnetic field generated by the component introducing a current signal into a stator phase current spectrum of the stator.

In accordance with yet another aspect of the invention, an x-ray tube includes a housing enclosing a vacuum chamber, a cathode positioned within the vacuum chamber and configured to emit electrons, and an anode positioned within the vacuum chamber to receive the electrons emitted from the cathode and configured to generate a beam of x-rays from the electrons. The x-ray tube also includes an induction motor configured to rotate the anode, with the induction motor further including a stator having a plurality of windings to generate a rotating magnetic field when a current is provided to the plurality of windings, a rotor positioned within the stator and configured to rotate relative thereto responsive to the rotating magnetic field so as to cause the anode to rotate, and a component positioned on one end of the rotor and being configured to alter a reluctance of the rotor, thereby creating a disturbance in the rotating magnetic field.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to an asynchronous motor that includes a component positioned adjacent to the rotor and stator of the motor. The positioning of the component within the magnetic field generated by the supply of current to the stator changes the rotor reluctance and magnetomotive force (MMF) permeance, which generates a disruption in the magnetic field, thereby causing a measurable change in the stator phase current spectrum. Frequencies measured within the stator phase current spectrum, including the disturbances caused by the component, can then be analyzed to measure the rotational speed of the rotor.

Figure 1:
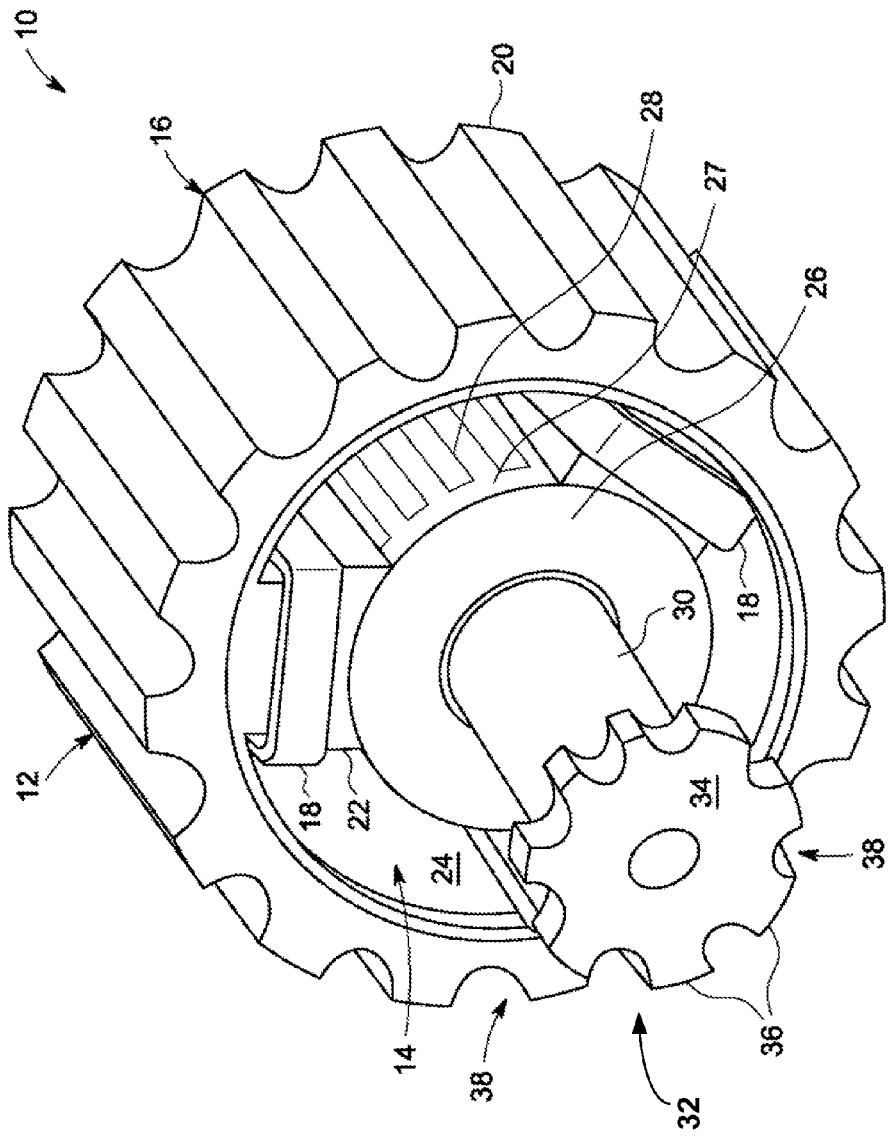
FIG. 1 is an illustration of an AC induction motor according to an embodiment of the invention.

Referring to FIG. 1, an AC induction motor 10 (i.e., asynchronous motor) is illustrated according to an embodiment of the invention. Asynchronous motor 10 includes a stator 12 and a rotor assembly 14 (i.e., "rotor"). Stator 12 further includes a stator core 16 and windings 18 wound on the stator core 16. The stator core 16 has a core main body 20 formed, for example, by stacking a large number of annular-shaped thin plates (not shown) made of electromagnetic steel and insulators (not shown) provided on axial end surfaces of the core main body. The stator core 16 is provided with a plurality of teeth 22 at a predetermined pitch along a circumferential direction thereof. According to an exemplary embodiment, windings 18 are wound on the respective teeth 22, with slots 24 formed between adjacent teeth 22 along the circumferential direction. As further shown in FIG. 1, rotor assembly 14 includes a rotor core 26 with end rings 27 and a number of rotor bars 28 coupled to the rotor core 26. According to the embodiment of FIG. 1, a rotor shaft 30 is mechanically coupled to the rotor core 26. However, according to additional embodiments of the invention, such as when motor 10 is incorporated into an x-ray tube, it is recognized that motor 10 and rotor assembly 14 may be provided without a rotor shaft 30 attached thereto.

In operation, an excitation current is provided to stator 12 such that current flows through stator windings 18. The flow of current through windings 18 creates a rotating magnetic field in an air gap (not shown) between the stator 12 and rotor 14 that induces current flow through rotor bars 28. These currents interact with the rotating magnetic field created by the stator 12 and, in effect, cause a rotational motion on the rotor 14. According to embodiments of the invention, asynchronous motor 10 may be in the form of 3-phase motor, however, it is recognized that motor 10 could also be in the form of a single phase motor or another multi-phase motor.

Figure 2:
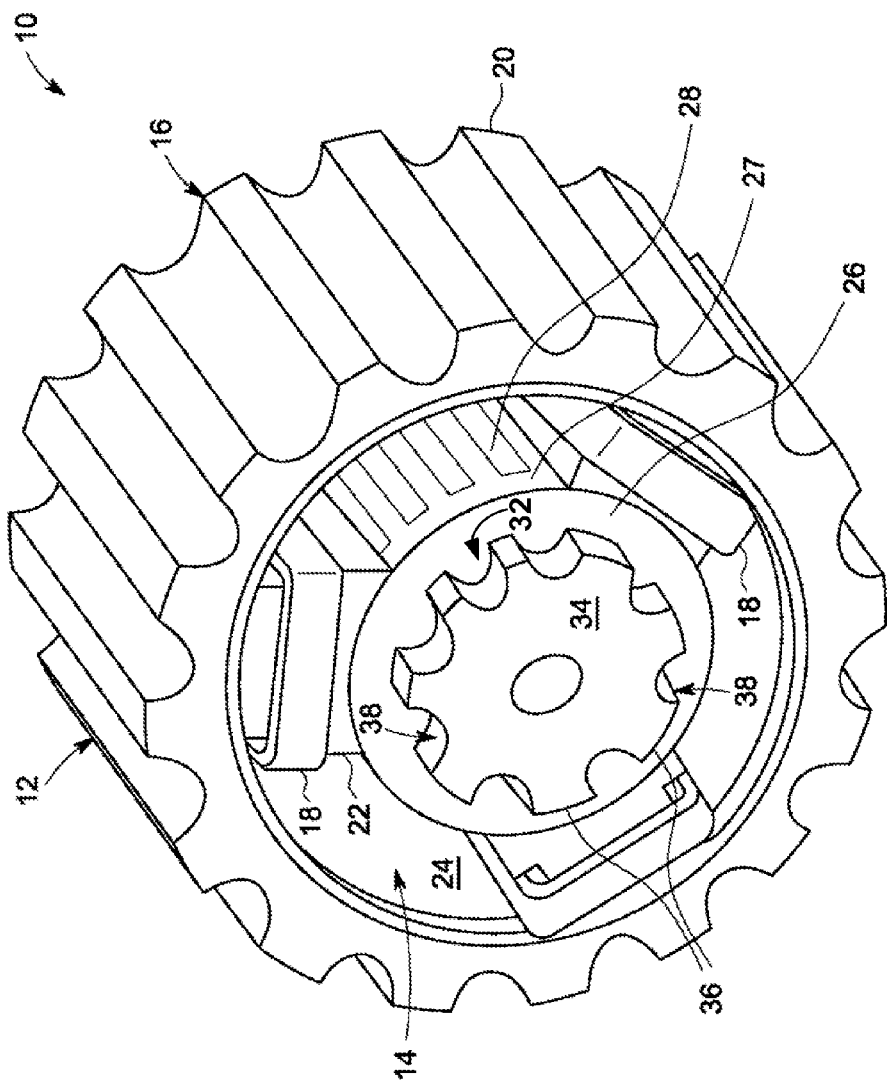
FIG. 2 is an illustration of an AC induction motor according to an embodiment of the invention.

Also included in asynchronous motor 10 is a component or mass 32 separate from the stator 12 and rotor assembly 14. According to one embodiment of the invention, component 32 is attached to rotor shaft 30 on one end of the rotor 14, such as via bolting welding, or brazing for example. Alternatively, and according to another embodiment of the invention, component 32 is attached directly to rotor core 26 via bolting welding, or brazing for example, as is shown in FIG. 2.

Figure 3:
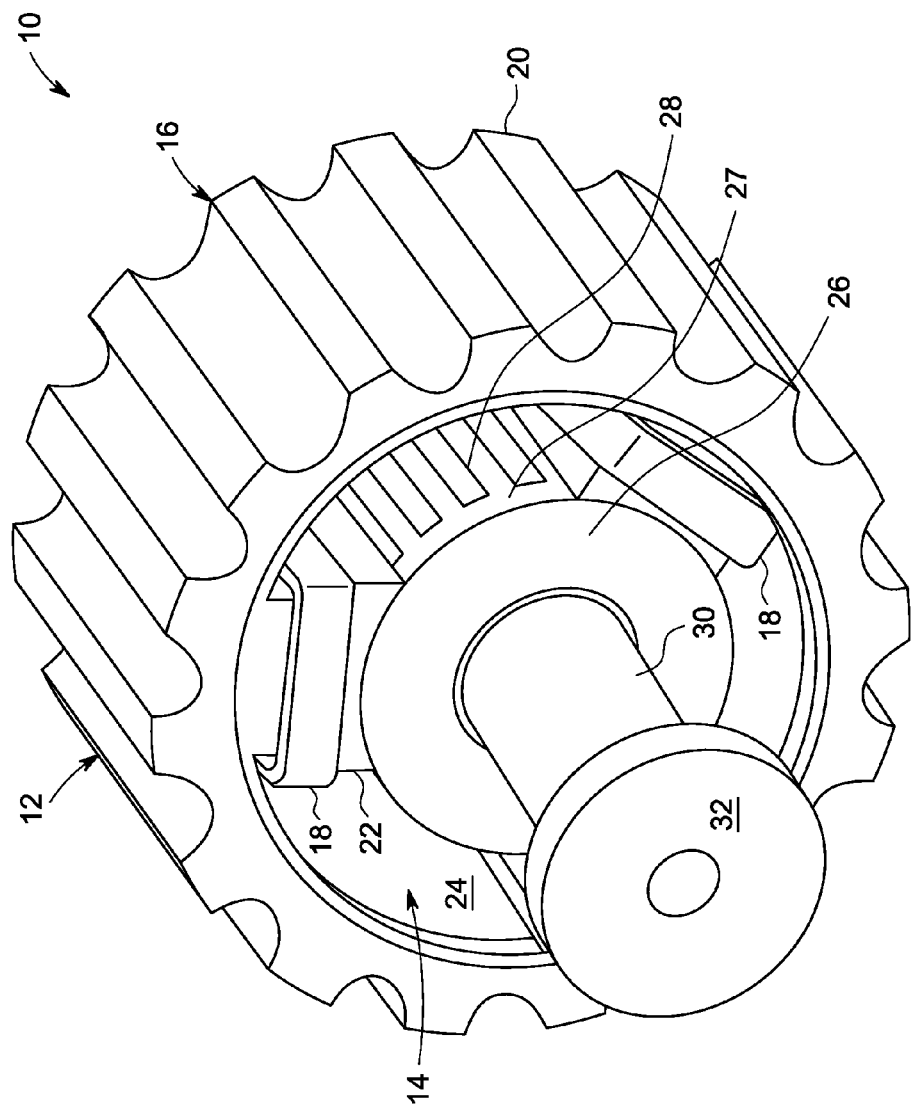
FIGS. 3 and 4 are illustrations of an AC induction motor according to embodiments of the invention.
Figure 4:
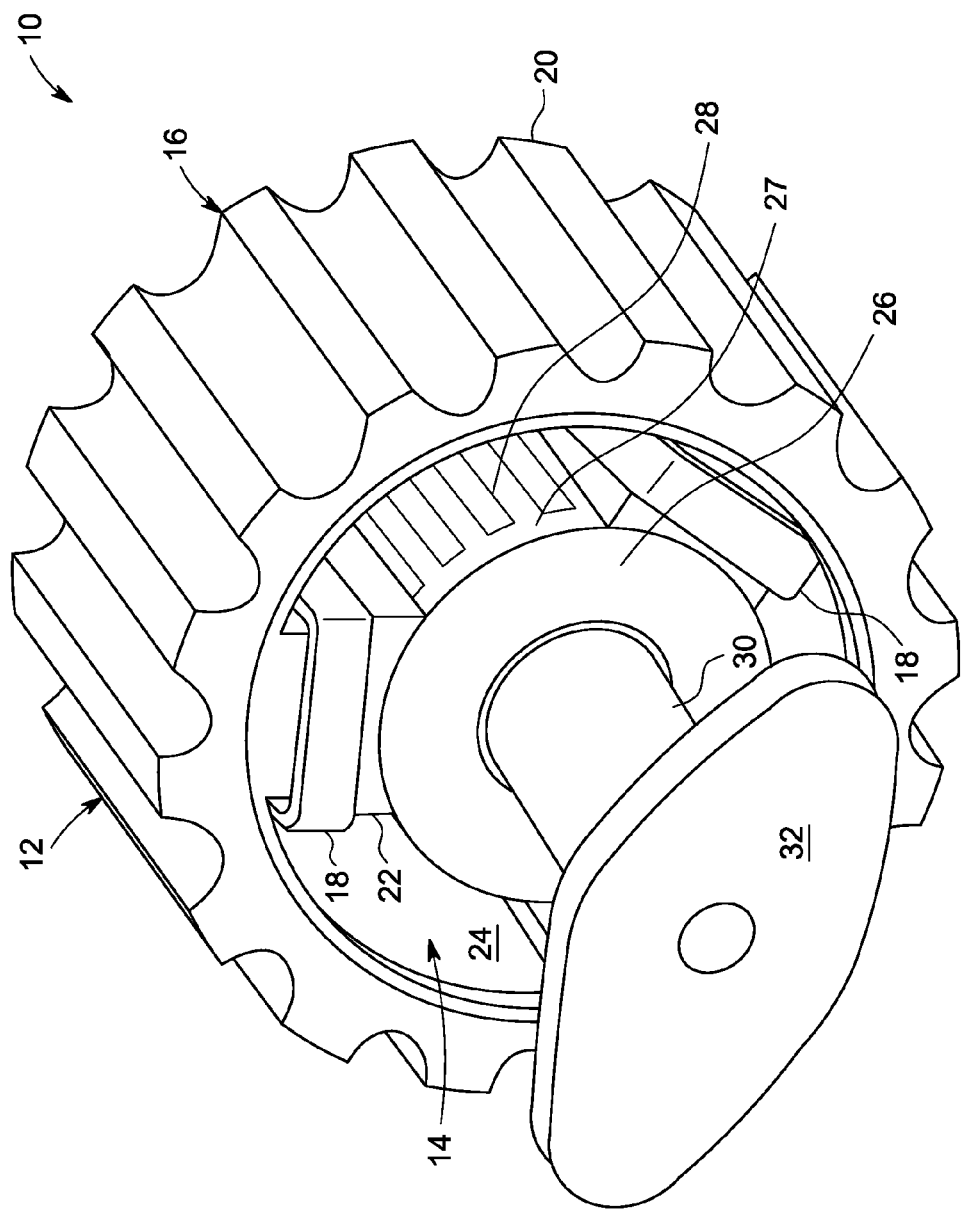

Referring again to FIG. 1, according to one embodiment of the embodiment, component 32 is constructed as a gear-type component having a slotted design that includes a body 34 and a plurality of projections 36 extending out from the body 34, with the projections 36 being spaced apart such that a plurality of slots 38 are formed between the projections 36. Alternatively, it is recognized that component 32 can also be constructed in various other forms, including other uniform or non-uniform constructions and with or without slots or teeth, such as a cylindrical shape as shown in FIG. 3 or an elliptical shape as shown in FIG. 4, for example. Thus, the embodiment of component 32 shown in FIG. 1 is not meant to be limiting.

According to embodiments of the invention, component 32 is configured to generate a disruption in the magnetic field generated by stator 12 (i.e., in the magnetic flux between the stator 12 and rotor assembly 14), thereby providing for accurate measurement of the rotation frequency or "rotor speed" of the rotor 14, as explained in detail below. To generate such a disruption, component 32 is formed as a ferromagnetic or paramagnetic component that alters a magnetic reluctance and magnetomotive (MMF) permeance of rotor assembly 14. That is, the altering of the magnetic reluctance of rotor 14 caused by component 32 affects an equivalent circuit of the motor 10, such that the MMF permeance that is produced during motor operation causes an identifiable disruption in the stator current. According to an exemplary embodiment, component 32 is formed from a ferromagnetic material (i.e., a ferrous material, such as electromagnetic steel), and thus here below component 32 is generally described as a "ferrous component" in accordance with a preferred embodiment of the invention.

For purposes of measuring the rotor speed, it is recognized that the change in reluctance in asynchronous motor 10 caused by ferrous component 32 generates a disturbance in the magnetic field (i.e., in the magnetic flux in the air gap between the stator 12 and rotor 14), thereby causing a subtle but measurable change in the stator phase current spectrum that can be measured. That is, the disturbance of the magnetic field creates harmonics in the stator phase current spectrum at certain identified frequencies. The stator current spectral components introduced by ferrous component 32, are at frequencies:

$$f_{comp} = f_s \left[ 1 \pm (1-s)\frac{k}{p} \right], \quad [\text{Eqn. 1}]$$

where k=1, 2, 3, ..., fs is the supply frequency, s is the per unit slip and p is the number of pair poles.

It is recognized that the amplitude of the stator current spectral components introduced by ferrous component 32, $f_{comp}$, is determined in part by the size and mass of the ferrous component. That is, the amount by which ferrous component 32 alters the magnetic reluctance of rotor assembly 14 is based on the size/mass of component 32, such that the amplitude of the stator current spectral components introduced by ferrous component 32 are also determined in part by the size and mass of the ferrous component. As an example, it is envisioned that ferrous component 32 can have a mass as low as 3% of the mass of rotor assembly 14 or a greater mass, such as 10% of the mass of rotor assembly 14. For a ferrous component 32 having a mass that is 10% of the mass of rotor assembly 14, an amplitude of the stator current spectral components introduced into the stator phase current spectrum by ferrous component 32 will be increased by 100 times.

Figure 5:
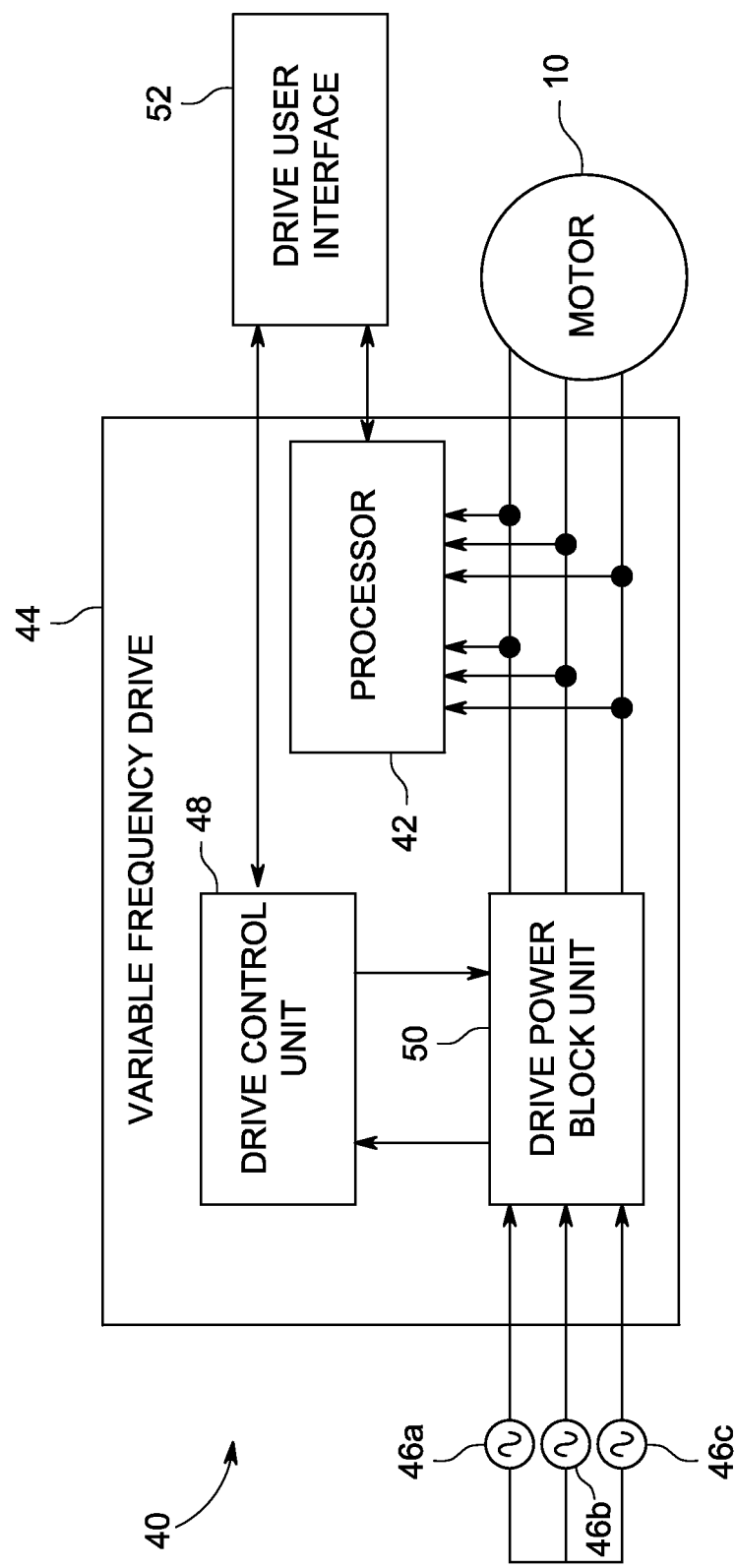
FIG. 5 is a schematic view of a motor assembly incorporating the AC induction motor of any of FIGS. 1-4 according to an embodiment of the invention.

According to embodiments of the invention, the change in the stator phase current spectrum can be measured, for example, by a processor connected to asynchronous motor 10. A motor assembly 40 is illustrated in FIG. 5 where such a processor 42 is implemented in a motor drive 44 used to drive asynchronous motor 10. As shown in FIG. 5, motor drive 44 may be configured, for example, as an adjustable or variable speed drive designed to receive a three-phase AC power input power input 46a-46c; however, it is recognized that single or other multi-phase arrangements are also envisioned. According to one embodiment of motor assembly 40, a drive control unit 48 is integrated within motor drive 44 and functions as part of the internal logic of the drive 44. Motor drive 44 also includes a drive power block unit 50, which may, for example, contain a rectification unit, a filtering inductor, a DC bus capacitor or battery, and a pulse width modulation (PWM) inverter (DC to controlled AC). Drive 44 receives the three-phase AC input 46a-46c, which is fed to drive power block unit 50. The drive power block unit 50 converts the AC power input to a DC power, inverts and conditions the DC power to a controlled AC power for transmission to asynchronous motor 10. Motor assembly 40 also includes a drive user interface 52 or drive control panel, configured to enable users to input motor parameters and drive operating parameters and other parameters necessary for the drive operation.

As set forth above, processor 42 is provided with motor drive 44 and is configured to measure the stator phase current from the asynchronous motor 10. According to one embodiment, processor 42 is integrated within drive 44 and functions as part of the internal logic of drive 44. Alternatively, processor 42 may be embodied in an external module distinct from drive 44, and receive data therefrom (e.g., current and/or voltage signals). In operation, processor 42 functions to receive/measure current signals from the stator 12 (FIG. 1) for purposes of analyzing the stator phase current spectrum. The processor 42 translates the measured stator phase current spectrum from the time domain to the frequency domain by use of a fast Fourier transform (FFT).

Upon application of an FFT, frequencies measured within the stator phase current spectrum, including the disturbances caused by the ferrous component, are then analyzed to measure the rotational speed of the rotor. That is, the processor 42 correlates the observed frequencies from the transformed stator phase current spectrum to the actual speed of the rotor. According to an exemplary embodiment of the invention, processor 42 performs a calculation for determining rotor speed in asynchronous motor 10 according to:

$$\omega = f_s - f_{sc} \quad [\text{Eqn. 2}],$$

where $\omega$ is the rotor speed, $f_s$ is the applied stator frequency, and $f_{sc}$ is the stator current spectrum peak.

Figure 6:
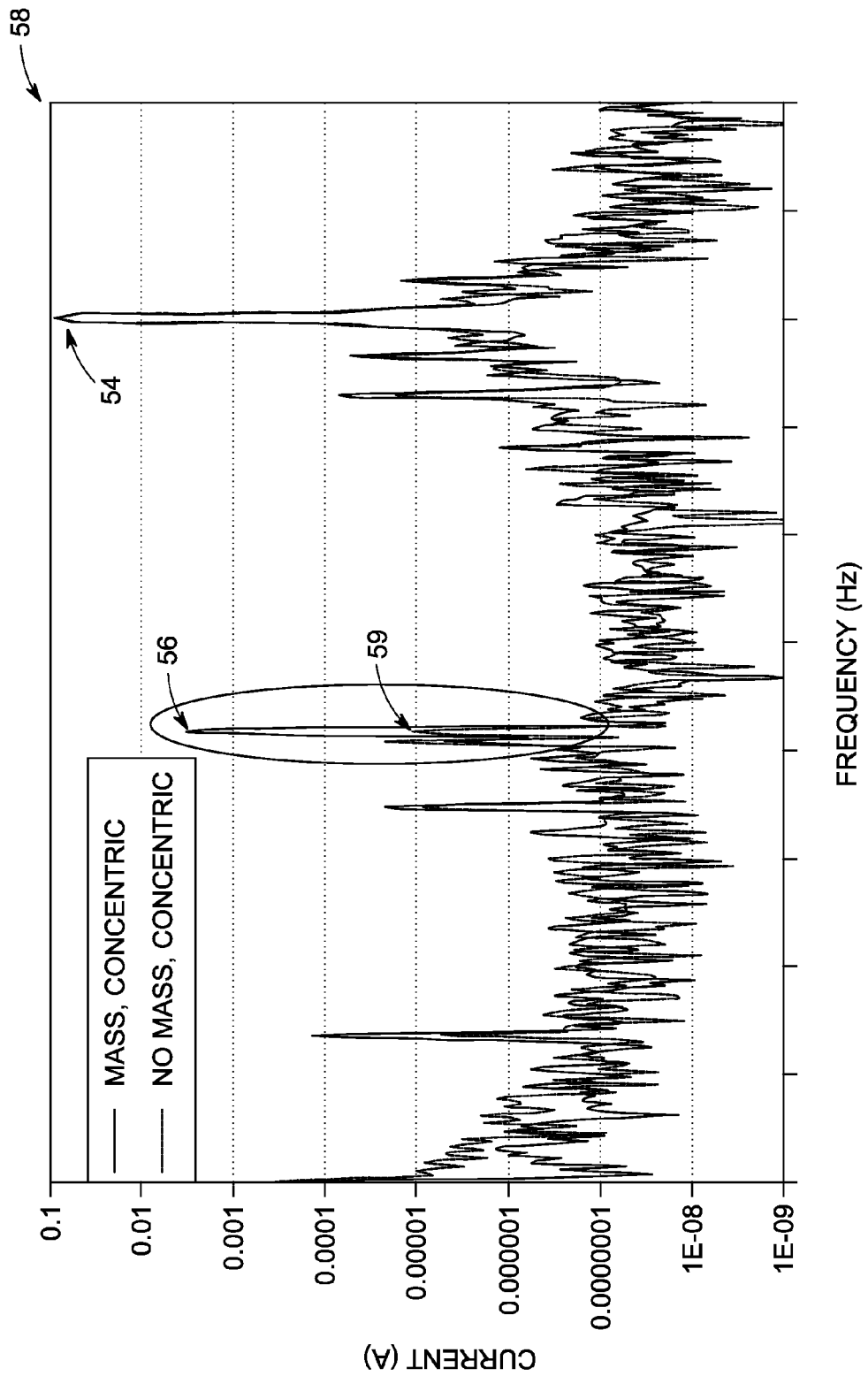
FIG. 6 illustrates graphs of a stator phase current spectrum in the time domain and the frequency domain.

Identification of the "applied stator frequency" and "stator current spectrum peak" from the stator phase current spectrum in the frequency domain, for purposes of determining values thereof in Eqn. 2, is illustrated in FIG. 6. That is, the applied stator frequency 54 and stator current spectrum peak frequency 56 are identifiable in the stator phase current spectrum 58 for use in calculating the rotor speed. The effect of ferrous component 32 on the amplitude of the measured stator current spectrum peak frequency 56 (i.e., increasing the amplitude) can be seen in FIG. 6, as compared to an amplitude of a measured stator current spectrum peak frequency 59 in a motor 10 not having a ferrous component 32 included therein. While Eqn. 2 is specifically set forth for use in calculating the rotor speed from the disruptions in the stator phase current spectrum caused by the ferrous component 32, it is recognized that other equations or algorithms could also be implemented in analysis of the stator phase current spectrum for purposes of determining the rotor speed, and thus embodiments of the invention are not meant to be limited merely to the current analysis technique described herein.

In analyzing the stator phase current spectrum, it is recognized that it is desirable to increase the signal-to-noise ratio (SNR) of received current signals to increase the robustness of the signal processing and measurement. Therefore, it is desirable to employ methods for increasing the amplitude of stator current spectrum components at desired frequencies. According to an embodiment of the invention, such increasing of stator current spectrum components can be achieved by employing load variation and eccentricity variation techniques. Varying of the load and/or eccentricity generates a disturbance of the air-gap magnetic flux that consequently creates harmonics in the currents as vibrations into the motor. Variations in load and/or eccentricity can thus be purposely introduced to increase the stator current spectrum signal so as to provide for increased robustness of determining rotor speed.

With respect to introducing a load variation, the stator current spectral components are at frequencies:

$$f_{load} = f_s \left[ 1 \pm (1-s)\frac{k}{p} \right], \quad [\text{Eqn. 3}]$$

where k=1, 2, 3, ..., $f_s$ is the supply frequency, s is the per unit slip and p is the number of pair poles.

With respect to introducing an eccentricity variation, the stator current spectral components are at frequencies:

$$f_{ecc} = f_s \left[ 1 \pm (1-s)\frac{k}{p} \right]. \quad [\text{Eqn. 4}]$$

As can be seen in Eqns. 1, 3, and 4, the stator current spectral components introduced by the ferrous component, the load variation, and the eccentricity are at a same/common frequency. Thus, the stator current spectrum components introduced by the load variation and eccentricity variation serve to increase the amplitude of the stator current spectrum component introduced by the ferrous component, providing for a more robust determination of rotor speed. In calculating the rotor speed according to Eqn. 2, both main signals and/or harmonics can be measured in the stator phase current spectrum. Such signals are measured at an increased or higher frequency in the range of 1 kHz or above, as measurement at such a higher frequency creates harmonic frequency separation. The signal measurements made at the higher frequency are thus analyzed to measure/identify the stator current spectrum peak for purposes of determining rotor speed, as set forth in Eqn. 2.

Figure 7:
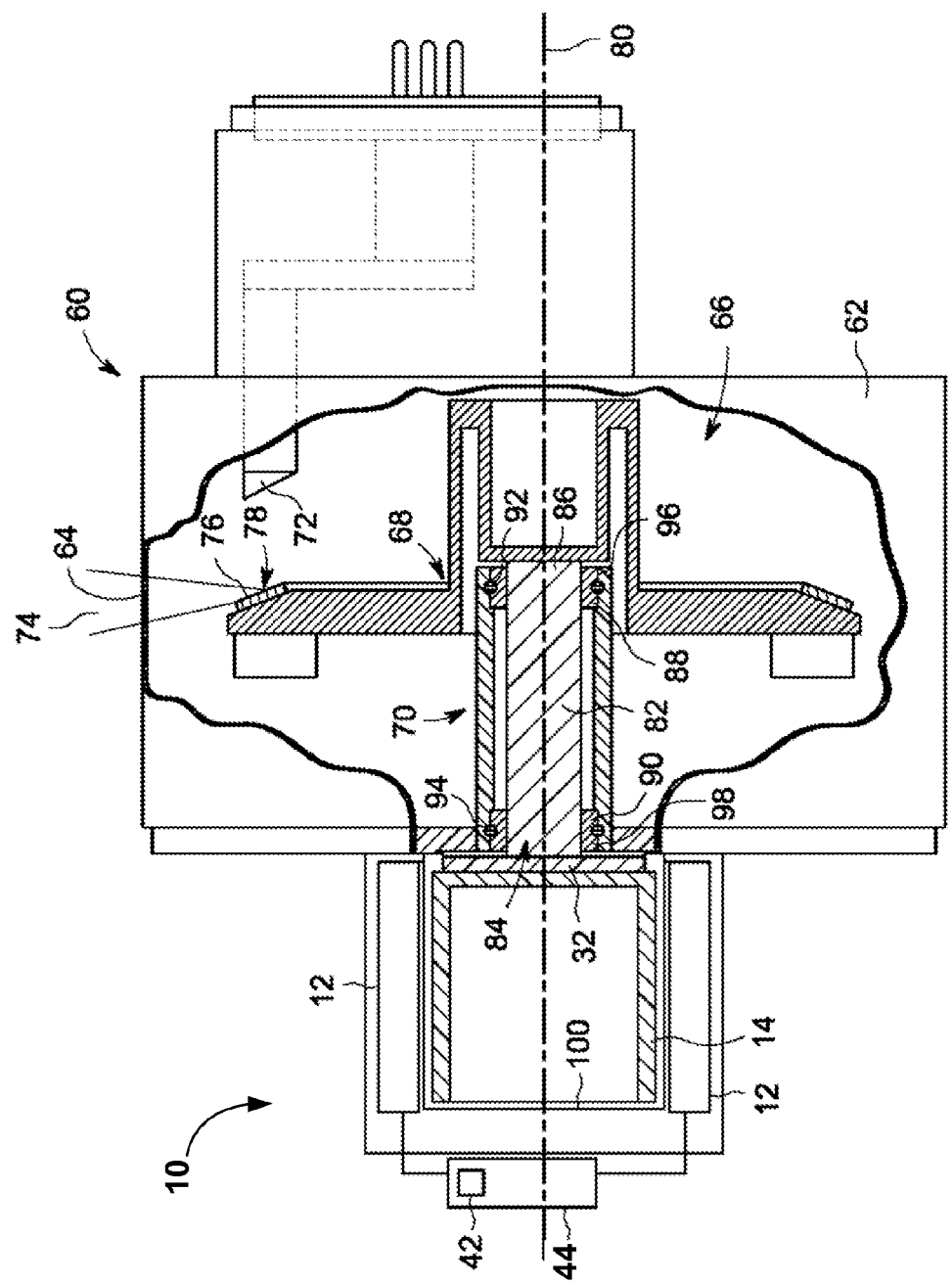
FIG. 7 is a cross-sectional view of an x-ray tube incorporating the AC induction motor of any of FIGS. 1-4 according to an embodiment of the invention.

Referring now to FIG. 7, implementation of an asynchronous motor 10 (such as shown in FIG. 1) into an x-ray tube 60 is shown according to an embodiment of the invention. While x-ray tube 60 is shown as incorporating cathode, anode, and bearing arrangements and/or structures described in detail below, it is recognized that x-ray tubes incorporating other varied cathode, anode, and bearing arrangements and/or structures are also within the scope of the invention. As such, the exemplary x-ray tube 60 shown in FIG. 7 incorporating the described cathode, anode, and bearing structures is not meant to limit the scope of the invention.

As shown in FIG. 7, according to an embodiment of the invention, asynchronous motor 10 is incorporated into an x-ray tube 60 that includes a casing or housing 62 having a radiation emission passage 64 formed therein. The casing 62 encloses a vacuum 66 and houses an anode 68, a bearing assembly 70, and a cathode 72. X-rays 74 are produced when high-speed electrons are suddenly decelerated when directed from the cathode 72 to the anode 68 via a potential difference therebetween of, for example, sixty thousand volts or more in the case of CT applications. The electrons impact a material layer 76 at focal point 78 and x-rays 74 emit therefrom. The point of impact is typically referred to in the industry as the track, which forms a circular region on the surface of the material layer 76, and is visually evident on the target surface after operation of the x-ray tube 60. To avoid overheating the anode 68 from the electrons, the anode 68 is rotated at a high rate of speed about a centerline 80 at, for example, 90-250 Hz.

The bearing assembly 70 includes a center shaft 82 attached to the rotor 14 of asynchronous motor 10 at first end 84 and attached to the anode 78 at second end 86. A front inner race 88 and a rear inner race 90 rollingly engage a plurality of front balls 92 and a plurality of rear balls 94, respectively. Bearing assembly 70 also includes a front outer race 96 and a rear outer race 98 configured to rollingly engage and position, respectively, the plurality of front balls 92 and the plurality of rear balls 94.

As shown in FIG. 7, the rotor 14 of asynchronous motor 10 resides inside a rotor can 100 of casing/housing 62 and is attached to center shaft 82. The stator 12 of asynchronous motor 10 resides outside rotor can 100 in either air or oil for cooling thereof, with the stator 12 being connected to a low or high efficiency motor drive 44 (LEM or HEM drive). In operation, the stator 12 functions to generate a magnetic field between the stator 12 and the rotor 14 by having a high current passed through a plurality of windings (not shown) included therein, as described above with respect to FIG. 1. The high current passing through the stator windings generates the magnetic field, thereby transmitting torque from the stator 12 to the rotor 14 according to known principles.

As further shown in FIG. 7, ferrous component 32 is included in asynchronous motor 10 and is positioned on an end of rotor 14 inside casing 62. According to one embodiment of the invention, the ferrous component 32 is secured to a rotor core (not shown) of rotor 14. When current is provided to stator 12 from motor drive 44, ferrous component 32 causes a disturbance in the rotating magnetic field, thereby inducing a voltage in the stator 14 and causing a subtle change in the stator phase current spectrum that can be measured, for example, by processor 42 of motor drive 44. The processor 42 analyzes the stator phase current spectrum and applies an FFT thereto to translate the measured stator phase current spectrum from the time domain to the frequency domain. Upon application of an FFT, the processor 42 then correlates the observed frequencies from the transformed stator phase current spectrum to the actual speed of the rotor 14, such as by way of Eqn. 2 set forth above or by way of other suitable current signature analysis techniques. In implementing the rotor speed estimation technique of Eqn. 2, the applied stator frequency and the stator current spectrum peak introduced by ferrous component 32 are identified in the stator phase current spectrum. According to one embodiment of the invention, load variation and/or eccentricity variation for motor 10 can be employed to increase the amplitude of the stator current spectrum peak and increase the SNR, so as to provide increased robustness for the rotor speed estimation. The disturbances in the stator phase current spectrum introduced by ferrous component 32 (with or without the added load/eccentricity variation) thus provide for accurate determine of the speed of rotor 14 without the need for any sensors, thereby providing for more efficient control of asynchronous motor 10 by motor drive 44.

According to embodiments of the invention, inclusion of ferrous component 32 in asynchronous motor 10 allows for continuous rotor speed measurement, enabling closed loop drive and rotor control. By doing so, the drive scheme can be optimized such that it can run at higher slip, thereby reducing the input power required. More specifically, the stator can be driven at an applied frequency above the expected run speed, reducing the required drive power. Furthermore, with continuous rotor speed feedback, power can be modulated to maintain the rotor speed within specifications. Additionally, by reducing the power required by the drive and delivered to the stator, losses are reduced, heat generation is minimized, and the motor drive and motor design have reduced performance requirements. This decrease in performance requirements allows for drive components to be rated accordingly, reducing cost and increasing reliability.

While FIG. 7 is illustrative of an asynchronous motor 10 such as shown and described in FIG. 2 as being incorporated into an x-ray tube environment, it is recognized asynchronous motor 10 can be implemented in a wide variety of applications and settings. In general, however, it is recognized that particular benefits are derived from asynchronous motor 10 when it is applied in an x-ray tube application or other application where the rotor may be in a vacuum, such that the rotor speed can't be easily measured with a physical sensor.

Furthermore, while embodiments of the invention described above are described with respect to measuring rotor speed via the introduction and analysis of a stator current spectral component into the stator phase current spectrum, it is also recognized that embodiments of the invention can also be directed to analysis of the stator voltage spectrum. That is, the altering of the rotor reluctance caused by component 32 can be utilized to determine rotor speed via analysis of the stator voltage spectrum rather than the stator current spectrum.

Therefore, according to one embodiment of the invention, an asynchronous motor includes a stator having a plurality of windings that is configured to generate a rotating magnetic field when a current is provided to the plurality of windings. The asynchronous motor also includes a rotor positioned within the stator configured to rotate relative thereto responsive to the rotating magnetic field and a component separate from the stator and the rotor that is positioned within the rotating magnetic field, with the component being configured to alter a magnetic reluctance of the rotor so as create a disturbance in the rotating magnetic field.

According to another embodiment of the invention, an asynchronous motor including a stator having a plurality of windings and being configured to generate a rotating magnetic field when a current is provided to the plurality of windings. The asynchronous motor also includes a rotor positioned within the stator having a rotor core and a plurality of rotor bar conductors, with the rotor configured to rotate relative to the stator responsive to the rotating magnetic field. The asynchronous motor further includes a component positioned adjacent to the rotor and configured to alter a reluctance of the asynchronous motor so as to generate a disturbance in the rotating magnetic field, with the disturbance in the rotating magnetic field generated by the component introducing a current signal into a stator phase current spectrum of the stator.

According to yet another embodiment of the invention, an x-ray tube includes a housing enclosing a vacuum chamber, a cathode positioned within the vacuum chamber and configured to emit electrons, and an anode positioned within the vacuum chamber to receive the electrons emitted from the cathode and configured to generate a beam of x-rays from the electrons. The x-ray tube also includes an induction motor configured to rotate the anode, with the induction motor further including a stator having a plurality of windings to generate a rotating magnetic field when a current is provided to the plurality of windings, a rotor positioned within the stator and configured to rotate relative thereto responsive to the rotating magnetic field so as to cause the anode to rotate, and a component positioned on one end of the rotor and being configured to alter a reluctance of the rotor, thereby creating a disturbance in the rotating magnetic field.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An asynchronous motor comprising:
   a stator including a plurality of windings and being configured to generate a rotating magnetic field when a current is provided to the plurality of windings;
   a rotor positioned within the stator and configured to rotate relative thereto responsive to the rotating magnetic field;
   a component separate from the stator and the rotor and positioned within the rotating magnetic field, the component being configured to alter a magnetic reluctance of the rotor so as create a disturbance in the rotating magnetic field; and
   a motor drive to control current and voltage provided to the stator, the motor drive including a processor programmed to:
      measure a stator phase voltage spectrum of the stator;
      apply a fast Fourier transform to the stator phase voltage spectrum to translate the stator phase voltage spectrum from a time domain to a frequency domain;
      determine a speed of the rotor based on an applied stator frequency in the stator phase voltage spectrum and a stator phase voltage spectrum peak.

2. The asynchronous motor of claim 1 wherein the component comprises a ferrous component having ferromagnetic properties.

3. The asynchronous motor of claim 1 wherein the rotor comprises:
   a rotor core; and
   a squirrel cage rotor mechanically coupled to the rotor core and positioned thereabout;
   wherein the component is mechanically coupled to the rotor core and positioned adjacent to one end of the squirrel cage.

4. The asynchronous motor of claim 1 further comprising a motor drive to control current and voltage provided to the stator, the motor drive including a processor programmed to:
   measure a stator phase current spectrum of the stator;
   apply a fast Fourier transform to the stator phase current spectrum to translate the stator phase current spectrum from a time domain to a frequency domain;
   determine a speed of the rotor based on observed frequencies within the stator phase current spectrum.

5. The asynchronous motor of claim 4 wherein the processor is further programmed to determine the speed of the rotor based on an applied stator frequency in the stator phase current spectrum and a stator phase current spectrum peak.

6. The asynchronous motor of claim 5 wherein the disturbance in the rotating magnetic field created by the component introduces a stator current spectral component into the stator phase current spectrum, with the stator current spectral component introduced by the component comprising the stator phase current spectrum peak used to determine the speed of the rotor.

7. The asynchronous motor of claim 6 wherein the processor is further programmed to introduce at least one of a variable load and a variable eccentricity to the asynchronous motor to introduce a stator current spectral component into the stator phase current spectrum, with the stator current spectral component introduced into the stator phase current spectrum by the at least one of the variable load and the variable eccentricity being at a same frequency as the stator current spectral component introduced by the component.

8. The asynchronous motor of claim 7 wherein the processor is further programmed to combine the stator current spectral component introduced from the at least one of the variable load and the variable eccentricity with the stator current spectral component introduced by the component to form a combined stator current spectral component having an increased amplitude.

9. The asynchronous motor of claim 1 comprising one of a single phase motor and a multi-phase motor.

10. The asynchronous motor of claim 1 wherein the component comprises:
    a body; and
    a plurality of projections extending out from the body, the plurality of projections being spaced apart such that a plurality of slots are formed between the plurality of projections.

11. An asynchronous motor comprising:
    a stator including a plurality of windings and being configured to generate a rotating magnetic field when a current is provided to the plurality of windings;
    a rotor positioned within the stator and configured to rotate relative thereto responsive to the rotating magnetic field; and
    a component separate from the stator and the rotor and positioned within the rotating magnetic field, the component being configured to alter a magnetic reluctance of the rotor so as create a disturbance in the rotating magnetic field;
    wherein the component comprises:
       a body; and
       a plurality of projections extending out from the body, the plurality of projections being spaced apart such that a plurality of slots are formed between the plurality of projections.

12. An asynchronous motor comprising:
    a stator including a plurality of windings and being configured to generate a rotating magnetic field when a current is provided to the plurality of windings;
    a rotor positioned within the stator and configured to rotate relative thereto responsive to the rotating magnetic field;
    a component separate from the stator and the rotor and positioned within the rotating magnetic field, the component being configured to alter a magnetic reluctance of the rotor so as create a disturbance in the rotating magnetic field; and a motor drive to control current and voltage provided to the stator, the motor drive including a processor programmed to:
  measure a stator phase current spectrum of the stator;
  apply a fast Fourier transform to the stator phase current spectrum to translate the stator phase current spectrum from a time domain to a frequency domain; and
  determine a speed of the rotor based on observed frequencies within the stator phase current spectrum, with the determination being based on an applied stator frequency in the stator phase current spectrum and a stator phase current spectrum peak;
wherein the disturbance in the rotating magnetic field created by the component introduces a stator current spectral component into the stator phase current spectrum, with the stator current spectral component introduced by the component comprising the stator phase current spectrum peak used to determine the speed of the rotor; and
wherein the processor is further programmed to introduce at least one of a variable load and a variable eccentricity to the asynchronous motor to introduce a stator current spectral component into the stator phase current spectrum, with the stator current spectral component introduced into the stator phase current spectrum by the at least one of the variable load and the variable eccentricity being at a same frequency as the stator current spectral component introduced by the component.

13. An asynchronous motor comprising:
a stator including a plurality of windings and being configured to generate a rotating magnetic field when a current is provided to the plurality of windings;
a rotor positioned within the stator and including a rotor core and a plurality of rotor bar conductors, the rotor configured to rotate relative to the stator responsive to the rotating magnetic field;
a component positioned adjacent to the rotor and configured to alter a reluctance of the asynchronous motor so as to generate a disturbance in the rotating magnetic field, wherein the disturbance in the rotating magnetic field generated by the component introduces a current signal into a stator phase current spectrum of the stator; and
a motor drive to control current and voltage provided to the stator, the motor drive including a processor programmed to:
  measure the stator phase current spectrum of the stator;
  apply a fast Fourier transform to the stator phase current spectrum to translate the stator phase current spectrum from a time domain to a frequency domain; and
  determine a speed of the rotor based on an applied stator frequency in the stator phase current spectrum and a stator phase current spectrum peak, the stator phase current spectrum peak corresponding to the current signal introduced by the component;
wherein the processor is further programmed to vary at least one of a load and an eccentricity of the asynchronous motor to introduce a current signal into the stator phase current spectrum to increase an amplitude of the stator current spectral component introduced by the component.

14. The asynchronous motor of claim 13 wherein the component is formed of a ferromagnetic material or a paramagnetic material.

15. The asynchronous motor of claim 13 wherein the component is mechanically coupled to the rotor core or a rotor shaft extending out from the rotor core and is positioned within the rotating magnetic field generated by the stator.

16. An x-ray tube comprising:
a housing enclosing a vacuum chamber;
a cathode positioned within the vacuum chamber and configured to emit electrons;
an anode positioned within the vacuum chamber to receive the electrons emitted from the cathode and configured to generate a beam of x-rays from the electrons; and
an induction motor configured to rotate the anode, the induction motor comprising:
  a stator including a plurality of windings and being configured to generate a rotating magnetic field when a current is provided to the plurality of windings;
  a rotor positioned within the stator and configured to rotate relative thereto responsive to the rotating magnetic field, thereby causing the anode to rotate; and
  a component positioned on one end of the rotor and being configured to alter a reluctance of the rotor, thereby creating a disturbance in the rotating magnetic field, and
a motor drive to control current and voltage provided to the induction motor, the motor drive including a processor programmed to:
  measure a stator phase current spectrum of the stator;
  apply a fast Fourier transform to the stator phase current spectrum to translate the stator phase current spectrum from a time domain to a frequency domain; and
  determine a speed of the rotor based on observed frequencies within the stator phase current spectrum;
wherein the component is configured to create a disturbance in the rotating magnetic field so as to introduce a stator current spectral component in the stator phase current spectrum that is detectable by the processor, such that the stator current spectral component provides for the determination of the speed of the rotor; and
wherein the processor is further programmed to vary at least one of a load and an eccentricity of the asynchronous motor to introduce a stator current spectral component into the stator phase current spectrum, with the stator current spectral component introduced by the variation of the at least one of the load and the eccentricity increasing an amplitude of the stator current spectral component introduced by the component.

17. The x-ray tube of claim 16 wherein the housing includes a rotor can positioned about the rotor such that the rotor is within the vacuum chamber, the stator being positioned about the rotor outside of the rotor can and outside the vacuum chamber, and wherein the component is positioned adjacent the rotor inside the vacuum chamber.

18. The x-ray tube of claim 16 wherein the component comprises a ferrous component having ferromagnetic properties.

* * * * *